Jan. 2, 1923. 1,440,456
G. R. GEHRANDT.
POWER TRANSMITTING MECHANISM.
FILED SEPT. 15, 1919.
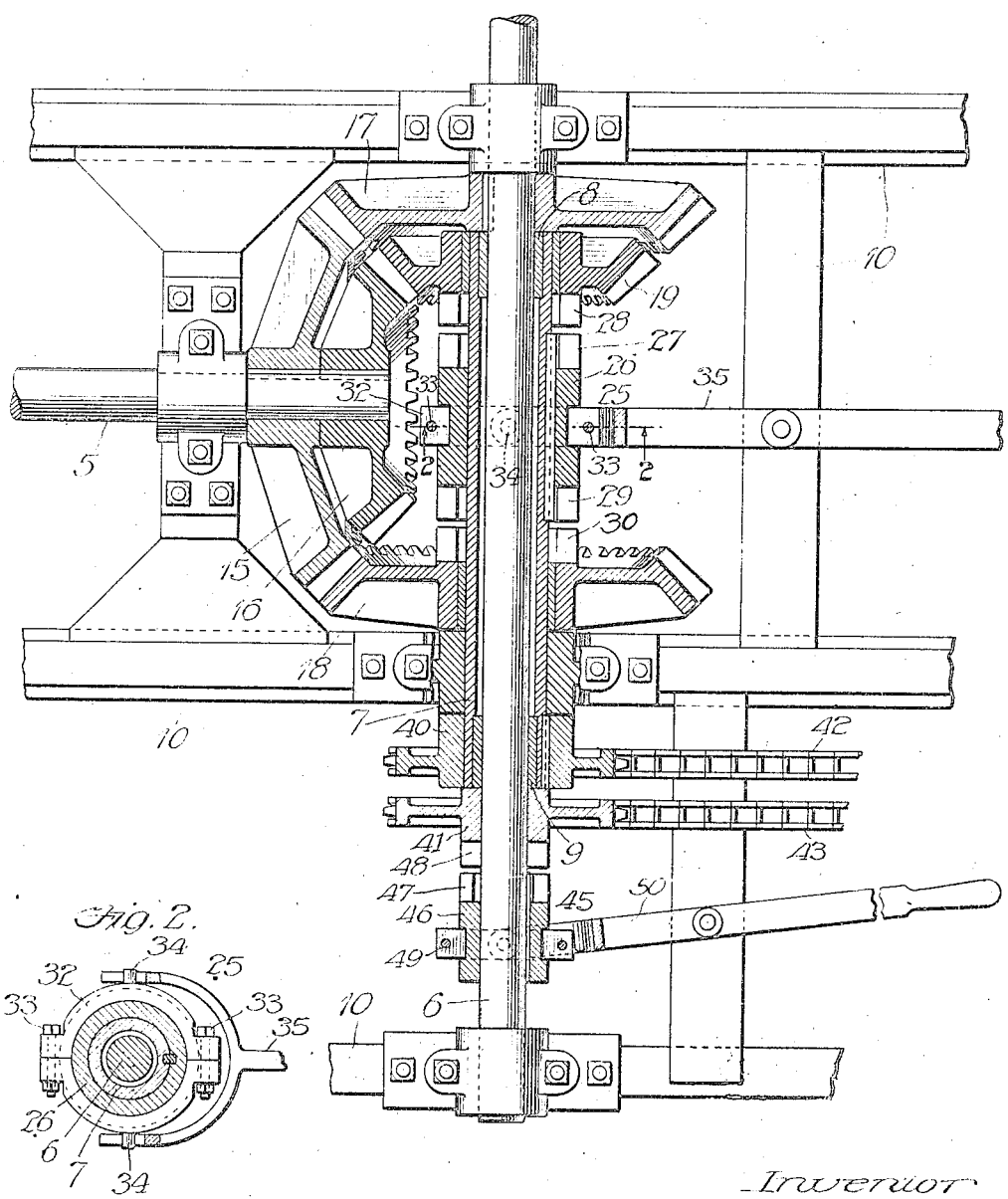

Patented Jan. 2, 1923.

1,440,456

UNITED STATES PATENT OFFICE.

GUSTAV R. GEHRANDT, OF OAK PARK, ILLINOIS, ASSIGNOR TO INTERNATIONAL EARTH-BORING MACHINE CORPORATION, OF CHICAGO, ILLINOIS, A CORPORATION OF DELAWARE.

POWER-TRANSMITTING MECHANISM.

Application filed September 15, 1919. Serial No. 323,843.

*To all whom it may concern:*

Be it known that I, GUSTAV R. GEHRANDT, a citizen of Germany, residing at Oak Park, in the county of Cook and State of Illinois, have invented certain new and useful Improvements in Power-Transmitting Mechanism, of which the following is a specification.

This invention relates to power transmitting mechanism.

In machine operation, it is often desirable or necessary to provide a multiple drive, that is to simultaneously drive one part of the machine in one direction and another part of the machine, sometimes in the same direction and another time in a reverse direction.

One of the objects of the present invention is to provide a simple mechanism for producing a multiple drive.

Another object is to provide mechanism whereby one of the drives may be readily reversed at will.

Another object is to provide a multiple drive which is compact, simple, reliable, efficient and readily enclosed.

Other objects of the invention will appear from the specification and claims.

An embodiment of the invention is illustrated in the accompanying drawings in which Fig. 1 is a section thru the mechanism.

Fig. 2 is a section on the line 2—2 of Fig. 1.

The drive shaft 5 of the power transmitting mechanism, which may be rotated from any suitable source of power, (not shown) is adapted, when required, to rotate a driven shaft 6 always in the same relative direction and to rotate a second driven shaft 7 in the same or reverse relative direction, as desired. Shaft 7 encircles shaft 6 and is rotatably journaled thereon by bearings 8 and 9.

The transmitting mechanism is supported by and provided with suitable bearings in a frame 10, the frame may be a part of the frame work of the machine with which the transmitting mechanism is associated or it may be formed as a unit with the mechanism, to be applied to the machine.

Shaft 5 carries and has rigidly secured thereto at one end a pair of driving gear wheels 15 and 16. Gear wheel 15 meshes at points 180 degrees apart, with a pair of driven gear wheels 17 and 18, while gear wheel 16 meshes with a driven gear wheel 19 adjacent gear wheel 17. Gear wheels 15 and 16 are in axial alignment and gear wheels 17, 18 and 19 are also in axial alignment at right angles to shaft 5.

Gear wheel 17 and shaft 6 are rigidly secured together, by suitable means, such as a key, so that shafts 5 and 6 always rotate in the same relative direction.

Gear wheels 18 and 19 are rotatably journaled upon hollow shaft 7, and, since they mesh with their respective co-operating gears, 180 degrees apart, they are rotated in the reverse direction. A clutch 25 is provided to inter-connect shaft 7 with either of the gear wheels 18 or 19.

Clutch 25 comprises a sleeve 26 slidable upon, but rotatable by shaft 7. This sleeve carries at one end jaws 27 adapted to engage corresponding jaws 28 on gear wheel 19, and at the other end a similar set of jaws 29 adapted to engage corresponding jaws 30 on gear wheel 18. A split collar 32 is secured in a groove in sleeve 26, being clamped thereto by bolts 33. Collar 32 has a pair of pins 34 on opposite sides thereof, which fit into openings in the bifurcated end of a clutch lever 35. Clutch lever 35 is suitably pivoted to the frame.

When the free end of clutch lever 35 is depressed, sleeve 26 is raised on shaft 7, causing the inter-engagement of jaws 27 and 28. Thereupon shaft 7 is driven by gear wheel 19 in the same direction as shaft 6 is being driven.

If the free end of clutch lever 35 is raised, sleeve 26 is lowered causing the inter-engagement of jaws 29 and 30. Shaft 7 is thereupon rotated by gear wheel 18 in the reverse direction.

When the clutch lever is in mid-position, both sets of clutch jaws are disengaged and shaft 7 does not rotate.

Shafts 6 and 7 may be suitably connected to the parts of the machine to be driven. In the embodiment shown, these shafts are adapted to drive a pair of sprocket wheels 40 and 41 over which the drive chains 42 and 43 respectively pass. These chains may pass over sprocket wheels associated with the parts to be driven. For example, chain 43 may be used to drive the spindle of a drill or boring machine, while chain 42 may be utilized to effect the raising and lowering of the drill spindle.

Sprocket wheel 40 is keyed to shaft 7 so that it rotates therewith in accordance with the position of the clutch 25. Sprocket wheel 41 is loosely mounted upon shaft 6 and is adapted to be connected thereto and disconnected therefrom by a clutch 45. Clutch 45 consists of a collar 46 slidably mounted upon but rotated by shaft 6. Sleeve 46 is provided with jaws 47 adapted to engage jaws 48 upon sprocket wheel 41. A split collar 49 similar to that of clutch 25 encircles sleeve 46 and is adapted to be raised and lowered by a clutch lever 50.

When clutch lever 50 is in the position shown, jaws 47 and 48 are out of engagement and sprocket wheel 41 is disconnected from shaft 6. When, however, the free end of lever 50 is depressed, sleeve 46 is raised and jaws 47 and 48 are thrown into engagement. The inter-engagement of jaws 47 and 48 connects shaft 6 to sprocket wheel 41 and the sprocket wheel is rotated thereby.

Having described my invention, what I claim is:—

1. Power transmitting mechanism having a drive shaft, a pair of concentric driven shafts to be operated thereby, means for connecting the drive shaft with one of the driven shafts to produce rotation always in the same relative direction and means for connecting the drive shaft with the other driven shaft so that the rotation may be relatively in the same or reverse direction.

2. Power transmitting mechanism having a drive shaft, a pair of gears secured thereto, a driven shaft, a gear associated therewith for engaging one of the gears on the drive shaft to rotate the driven shaft always in the same relative direction, a second driven shaft, two gears associated therewith, one gear engaging each of the gears secured to the drive shaft and means for interconnecting the second driven shaft with either of the gears associated therewith so that the second driven shaft may be driven in either direction relative to the drive shaft.

3. Power transmitting mechanism having two driven shafts, one shaft being journaled upon the other, three gear wheels associated with said driven shafts, a drive shaft, a pair of gear wheels on the drive shaft for cooperating with the gear wheels of the driven shafts, and means for interconnecting one of the driven shafts with the gear wheels to cause said shaft to be driven in either direction at will.

4. Power transmitting mechanism having an inner driven shaft, an outer driven shaft journaled on said inner shaft, a drive shaft, a pair of driving gear wheels secured to the drive shaft to be rotated thereby, a gear wheel on said inner shaft and cooperating with one of said driving gears to rotate said inner shaft always in the same direction, a pair of driven gear wheels journaled upon said outer shaft, each gear wheel cooperating with one of said driving gear wheels whereby said driven gear wheels are rotated in opposite directions, and a clutch keyed to slide upon and rotate said driven shaft and operable to interconnect said shaft with either of said driven gear wheels to cause rotation of said outer shaft in either direction.

5. Power transmitting mechanism having a drive shaft, a pair of driving gear wheels rotated thereby, an inner driven shaft, a gear wheel thereon engaging one of said driving wheels to rotate said inner shaft always in the same direction, an outer driven shaft journaled on said inner shaft, a pair of driven gear wheels journaled to freely rotate upon said outer shaft and engaging said driving gear wheels to be rotated in opposite directions, a clutch for interconnecting said outer shaft with either of the driven gear wheels associated therewith whereby said outer shaft may be driven in either direction, a driven member associated with said inner shaft, and a clutch for connecting and disconnecting said inner shaft and said driven member.

In testimony whereof I hereunto subscribed my name.

GUSTAV R. GEHRANDT.